United States Patent [19]

Cook et al.

[11] Patent Number: 4,504,924
[45] Date of Patent: Mar. 12, 1985

[54] CARRY LOOKAHEAD LOGICAL MECHANISM USING AFFIRMATIVELY REFERENCED TRANSFER GATES

[75] Inventors: Peter W. Cook, Mt. Kisco, N.Y.; Hung-Hui Hsieh, San Jose; Glen S. Miranker, Sunnyvale, both of Calif.

[73] Assignee: International Business Machines Corporation, Armonk, N.Y.

[21] Appl. No.: 392,828

[22] Filed: Jun. 28, 1982

[51] Int. Cl.³ .............................. G06F 7/50
[52] U.S. Cl. ................................... 364/787
[58] Field of Search ........................ 364/787, 786

[56] References Cited

U.S. PATENT DOCUMENTS

| | | | |
|---|---|---|---|
| 3,649,815 | 3/1972 | Clifford | 235/92 LG |
| 3,878,986 | 4/1975 | Hirasawa | 235/175 |
| 3,932,734 | 1/1976 | Parsons | 364/786 |
| 4,054,788 | 10/1977 | Maitland et al. | 364/786 |
| 4,152,775 | 5/1979 | Schwartz | 364/786 |
| 4,218,750 | 8/1980 | Carter et al. | 364/770 |
| 4,422,157 | 12/1983 | Vhlenhoff | 364/786 |
| 4,425,623 | 1/1984 | Russell | 364/786 |

Primary Examiner—David H. Malzahn
Attorney, Agent, or Firm—Carl C. Kling

[57] ABSTRACT

Complex logical mechanism, for simultaneously producing output signals related logically to a set of input signals, implemented in transfer gate pairs. The first transfer gate of each pair is connected generally in series and is controlled by conduction according to the signals applied. The second transfer gate of each pair shunts the output node of its related first transfer gate to ground, when enabled by a control signal complementary to the data pattern applied to the first transfer gate of the pair. This direct control of line voltages affirmatively drives the lines or affirmatively grounds the lines to eliminate back circuits.

Carry propagation to higher order bit positions is along carry propagate lines, with series connected carry propagate first transfer gates. Order positions not having data values appropriate for carry propagation do not transmit carry values—these transfer gates are not controlled for conduction, but are nonetheless subject to possible back circuits. Carry propagate negation second transfer gates, connected in respective pairs with the carry propagate first transfer gates, are controlled by signals complementary to the control signals for the respectively carry propagate transfer gates, and, when enabled, connect the output nodes of the respective carry propagate first transfer gates directly to ground reference potential.

1 Claim, 2 Drawing Figures $$G_3 + H_3 G_2 + H_3 H_2 G_1 + H_3 H_2 H_1 G_0 + H_3 H_2 H_1 H_0 C_{in} = C_3$$
$$G_2 + H_2 G_1 + H_2 H_1 G_0 + H_2 H_1 H_0 C_{in} = C_2$$
$$G_1 + H_1 G_0 + H_1 H_0 C_{in} = C_1$$
$$G_0 + H_0 C_{in} = C_0$$

WHERE: $H = A \oplus B$, $G = A \cdot B$

CARRY LOOKAHEAD LOGICAL MECHANISM USING AFFIRMATIVELY REFERENCED TRANSFER GATES

BACKGROUND OF THE INVENTION

1. Field of the Invention

The invention relates generally to complex digital logic circuits and more particularly to a carry lookahead logical mechanism using affirmatively referenced pairs of similar field effect transistor transfer gates to provide carry outputs logically related to complex data inputs.

2. Description of the Prior Art

Complex logic circuits including carry-look-ahead logic circuits are well-known in the prior art, implemented in a variety of technologies. Straight-forward techniques of implementing complex logic circuits based upon Boolean algebraic statements have been described in detail. Straightforward application of these rules to implement a complex logic circuit may require great numbers of logical elements which, in turn, take up space in the circuit package and use power, often to such a degree that additional circuits are required simply to provide repowering and diagnostic capability. Special provisions are sometimes required to prevent back circuits.

Transfer gates are also known. These gates have the characteristic of switching on or off as the result of a gating pulse, and holding this condition for a period of time significant with respect to cycle time. While simple and easy to use in implementing logic, transfer gates are quite bidirectional and subject to back-circuit problems in complex circuits.

SUMMARY OF THE INVENTION

It is an object of this invention to provide a complex logic circuit using a minimum number of similar transfer gates in circuits which are affirmatively referenced to a reference potential or to an operating potential.

A more particular object of the invention is to provide a carry lookahead circuit implementation minimizing logical elements and thus minimizing area used in integrated circuits, utilizing the special characteristic of transfer gates to advantage and yet preventing back circuits by providing affirmatively referenced pairs of transfer gates on each logical string. An advantage of the invention is that a given logical string is affirmatively referenced to ground when not affirmatively referenced to operating potential, thus eliminating back circuits inherent in transfer gate implementations of carry lookahead propagate triangles.

DESCRIPTION OF THE PREFERRED EMBODIMENT

Figure 1:
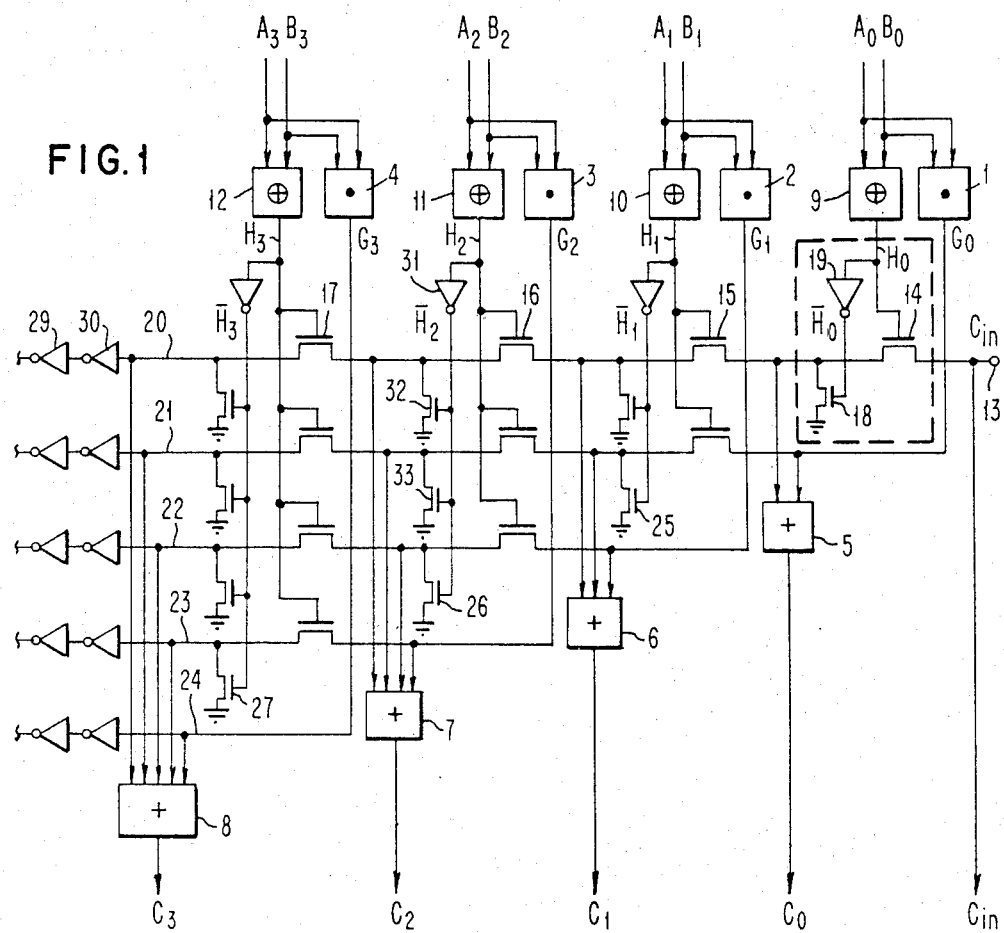
FIG. 1 is a schematic diagram of a carry-look-ahead circuit according to the invention.
Figure 2:
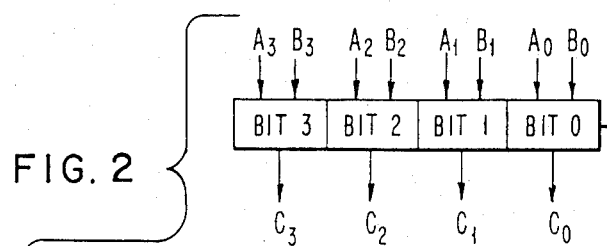
FIG. 2 is a composite logic diagram showing the logical requirement of the carry-look-ahead circuit of FIG. 1.

FIG. 1 shows a carry-look-ahead circuit for implementing the logic diagram in FIG. 2. Inputs A0,B0 through A3,B3, corresponding to binary bit positions 0-3, are made available at AND circuits 1, 2, 3 and 4 respectively. Where, in a given bit order position, both A and B are the logic value 1, it is required to generate a carry from the related AND circuit 1-4 (for example, AND circuit 1 for A0,B0). These generated carries are applied directly to respective OR circuits 5, 6, 7 and 8 for carry positions C0, C1, C2 and C3. Where a carry is generated, the generated carry is provided directly at the carry output OR circuit.

Carry propagation, however, is more complex than carry generation. Carry propagation for positions 0-3 is commenced by EXCLUSIVE OR circuits 9, 10, 11 and 12 respectively. In a position which generates a carry, there is no need to propagate the carry; in a position having inputs 0—0, no carry is propagated. In those positions set for carry propagation by inputs 0-1 or 1-0, the carry out requires a carry into the position (either generated at the next lower order position or generated at a still lower position and propagated through one or more intervening positions).

There are essentially two ways that a carry signal can be developed in a fast carry adder. These are:

(1) a carry is generated within the order position, and
(2) a carry generated in a previous order position is propagated through one or more intervening order positions which are set to propagate.

Terms Cin, G0, G1, G2 and G3 are shown in FIG. 2 as well as in FIG. 1. In keeping with the logic shown in FIG. 2, each carry generate term G0 through G3 is applied directly to the output OR circuit for the related bit order position and via intervening carry propagate transfer gates to the output OR circuits of higher bit orders. For example, carry generate term G1 from AND circuit 2 provides output C1 directly from output OR circuit 6 and is made available via intervening transfer gates respectively to output OR circuit 7 for position C2 and output OR circuit 8 for position C3.

Circuit elements 1 through 12 are not significantly different from similar circuit elements in other carry-look-ahead circuits or other complex logic circuits. These circuit elements participate with a logic triangle to provide the increasingly complex logic required by the carry propagation terms of the higher order positions. The propagation triangle may be logically derived and requires a finite number of logical terms. These logical terms (assuming perfect isolation of elements) could, in turn, be implemented in a minimum number of elements. In practice, however, such complex circuits as carry-look-ahead adders tend to grow as $n^3$, where n is the number of order positions. Implementing the complex logic carry-look-ahead circuit according to this invention causes the number of devices to grow slower than $2n^2$. A large saving in semiconductor area in the integrated circuit thus is possible. This saving is important in itself and also makes possible the implementation of the complex circuit carry-look-ahead with lower propagation delay than that of such complex circuits implemented with random logic.

Isolation against the possibility of back circuits is required in minimizing the number of elements in a complex circuit. The transfer gate is a very simple fast circuit element which lends itself well to integrated circuit techniques, but unfortunately the transfer gate is quite bidirectional and thus also lends itself to the possibility of back circuits. In a complex circuit which has random inputs on any given cycle, it is also important that the data history not be stored from cycle to cycle on capacitances which might cause erroneous switching.

The maximum delay, assuming carefully prepared circuit elements, is at the highest order propagate circuit. In the circuit shown in FIG. 1, this is the delay of propagating a carry in from Cin node 13 through four orders of carry propagation to provide an output carry C3 from output OR circuit 8. This carry must be propagated through transfer gates 14, 15, 16 and 17, which have been preset conductive by outputs respectively from EXCLUSIVE OR circuits 9 through 12. A characteristic of the transfer gate is that it uses insignificant current during a normal operating cycle to continue in the charged or conductive state, even though the input signal may have disappeared. The control nodes of transfer gates 14 through 17 thus may be set for carry propagation by carry propagate outputs from their related EXCLUSIVE OR circuits early in the cycle. Timing coincidence is not critical. It is important, however, that back circuits not cause spurious switching of the carry propagate transfer gates. For order position 0, transfer gate 18 and inverter 19 provide the isolation. The signal at the gate of transfer gate 14 is thus H0 and the signal at the gate of transfer gate 18 is $\overline{H0}$. This means that circuit carry in transfer gate 14 for term H0 is systematically driven to ground reference potential upon the presence of term $\overline{H0}$. That is, signal $\overline{H0}$ rigorously grounds the carry-in line 20 even if all higher orders are set in propagate position.

Lines 21, 22, 23 and 24 are similarly served by respective carry negation transfer gates 25, 26, 27 and additional circuitry including a carry negation transfer gate for line 24 if higher order positions should be added to the circuitry shown.

Inverter tandem 29–30 are provided for powering as required by the technology. Additional bit positions may be added, using known techniques of extending the carry propagation triangle in extrapolation or replication of FIG. 1 and FIG. 2.

The arrangement of propagate-set transfer gates in series along the carry propagate lines for each position and the carry negation transfer gates provide necessary carry-look-ahead without being subjected to back circuit problems.

At bit position 1, for example, carry propagate transfer gate 15 provides for the maximum carry propagation situation at that bit position, from $C_{in}$ through carry propagate mechanisms for bit positions 0, and 1, along line 20. In the situation H1 H0 $C_{in}$ (FIG. 2), carry propagate transfer gates 14 and 15 are preset to transmit the $C_{in}$ signal through transfer gates 14 and 15 and OR circuit 6 to provide output $C_1$. Assuming that the next higher bit position $A_2B_2$ does not have a 0,1 or 1,0 input, inverter 31 provides signal $\overline{H}_2$, indicating the complement of the carry propagate situation at bit order position 2. Transfer gates 32, 33 and 26 are preset off by the $\overline{H}_2$ signal from inverter 31, setting to ground all of carry propagate lines 20, 21 and 22 and grounding the input nodes of the carry propagate transfer gates for the next higher order.

OPERATION

There are a number of transfer gate pairs, each comprising a series-connected transfer gate controlled by a control signal and a shunt-connected transfer gate controlled by a complement to the control signal.

In the carry-look-ahead complex, logical mechanisms for a number of bit positions of ascending order are arranged to provide data-appropriate carry generate signals ($C_{in}$, $G_0$, $G_1$, $G_2$, $G_3$) and data-appropriate carry propagate signals (H1, H2, H3, H4).

Assume for example the addition of 1010 (A) and 1001 (B) with a $C_{in}$ value 1. The sum:

```
 1010    10
 1001     9
    1     1
-----   ---
10100    20
```

Only the carry generate and carry propagate terms are of interest. These are:

$$H_0C_{in}, \quad H_1H_0C_n$$
$$C_0 = H_0C_{in}$$
$$C_1 + H_1H_0C_{in}$$
$$\overline{C_2}$$
$$C_3 = G_3$$

The carry-look-ahead complex, for data values of this example, provides carry signals 1011.

The carry-look-ahead complex illustrated accommodates all values of data 0000+0000 to 1111+1111. Additional order positions can be implemented by well-known techniques of replication and extra-polation.

What is claimed is:

1. Carry lookahead logical mechanism for a number of bit positions of ascending order, having a set of carry generate logical mechanism (1–4) and a related set of carry propagate logical mechanisms (9–12) associated with a carry propagation triangle (13–33),
   characterized by
   (a) a set of carry propagate field effect transistor transfer gates (14–17), each having a control node and first and second bidirectional signal nodes, arranged in series subsets as a plurality of carry propagate lines (20–24) respectively related each to a bit order position, essentially one carry propagate transfer gate for each higher order bit position in each such carry propagate line with first signal node being designated input node and second signal node being designated output node in relation to carry propagation;
   (b) a set of carry propagate negation field effect transistor transfer gates (18, 25–27, 32–33) each having a control node and first and second signal nodes, each having its first signal node connected to the output node of the respectively related carry propagate transfer gate (14–17) and to a respectively related one of said carry propagate lines (20–24), and having its second signal node connected to reference potential; and
   (c) a set of carry propagate negation control lines ($\overline{H}_0$–$\overline{H}_3$) connected to the carry propagate logical mechanisms (9–12) and to the control nodes of said set of carry propagate negation transfer gates (18, 25–27, 32–33) for controlling conduction of individual ones of said carry propagate negation transfer gates complementary to conduction of related individual ones of said carry propagate transfer gates (14–17, etc.), whereby each carry propagate transfer gate is provided affirmative conductivity or complementary affirmative back-circuit prevention by driving its output node via its respectively related carry propagate negation transfer gate to reference potential.

* * * * *